(12) United States Patent
Somogyi et al.

(10) Patent No.: US 7,446,662 B1
(45) Date of Patent: Nov. 4, 2008

(54) INTELLIGENT RFID TAG FOR MAGNETIC FIELD MAPPING

(75) Inventors: Andreas Somogyi, Sagamore Hills, OH (US); Vivek R. Bapat, Pittsburgh, PA (US); Sujeet Chand, Brookfield, WI (US); Kenwood H. Hall, Hudson, OH (US); Richard A. Morse, Hudson, OH (US); Joseph P. Owen, Jr., Elm Grove, WI (US); Arthur P. Pietrzyk, Thompson, OH (US); Kenneth A. Tinnell, Loveland, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 181 days.

(21) Appl. No.: 11/235,730

(22) Filed: Sep. 26, 2005

(51) Int. Cl.
*G08B 13/14* (2006.01)

(52) U.S. Cl. .............. 340/572.4; 340/10.41; 340/10.51; 340/539.21; 340/539.26

(58) Field of Classification Search ............. 340/572.1, 340/572.4, 10.1, 10.4, 10.41, 10.51, 539, 340/539.22, 539.26, 539.21, 539.17, 539.16, 340/825.49, 539.1
See application file for complete search history.

(56) References Cited

U.S. PATENT DOCUMENTS

| | | | |
|---|---|---|---|
| 3,858,212 A | 12/1974 | Tompkins et al. | |
| 4,949,299 A | 8/1990 | Pickett et al. | |
| 5,613,228 A * | 3/1997 | Tuttle et al. | 340/539.21 |
| 5,621,199 A | 4/1997 | Calari et al. | |
| 5,629,981 A | 5/1997 | Nerlikar | |
| 5,701,127 A * | 12/1997 | Sharpe | 340/10.2 |
| 5,703,347 A | 12/1997 | Reddersen et al. | |
| 5,785,181 A | 7/1998 | Quartararo, Jr. | |
| 5,822,714 A | 10/1998 | Cato | |
| 5,874,724 A | 2/1999 | Cato | |
| 5,874,896 A | 2/1999 | Lowe et al. | |
| 5,905,249 A | 5/1999 | Reddersen et al. | |
| 5,910,776 A | 6/1999 | Black | |
| 5,949,335 A | 9/1999 | Maynard | |
| 5,964,656 A | 10/1999 | Lawler, Jr. et al. | |
| 5,971,587 A | 10/1999 | Kato et al. | |

(Continued)

FOREIGN PATENT DOCUMENTS

DE 10314260 A1 10/2004

(Continued)

OTHER PUBLICATIONS

International Search Report dated May 17, 2006 for International Patent Application Serial No. PCT/EP2005/007878, 8 pages.

(Continued)

*Primary Examiner*—Thomas J Mullen, Jr.
(74) *Attorney, Agent, or Firm*—Amin Turocy & Calvin LLP; R. Scott Speroff

(57) ABSTRACT

System(s) and method(s) to increase the accuracy and efficiency of an RFID system is provided. A system includes an RFID component that receives a signal from an RFID reader, and an identifier component that interfaces with the RFID component and identifies the source of the signal. The system further includes a signal strength component that interfaces with the identifier component and measures the strength of the signal. The system can include an environment component that analyzes an operating environment.

24 Claims, 10 Drawing Sheets

U.S. PATENT DOCUMENTS

| | | |
|---|---|---|
| 5,973,600 A | 10/1999 | Mosher, Jr. |
| 6,049,745 A | 4/2000 | Douglas et al. |
| 6,091,998 A | 7/2000 | Vasko et al. |
| 6,116,505 A | 9/2000 | Withrow |
| 6,121,878 A | 9/2000 | Brady et al. |
| 6,144,301 A | 11/2000 | Frieden |
| 6,150,948 A | 11/2000 | Watkins |
| 6,154,790 A | 11/2000 | Pruett et al. |
| 6,169,483 B1 | 1/2001 | Ghaffari et al. |
| 6,170,059 B1 | 1/2001 | Pruett et al. |
| 6,172,609 B1 | 1/2001 | Lu et al. |
| 6,205,362 B1 | 3/2001 | Eidson |
| 6,263,440 B1 | 7/2001 | Pruett et al. |
| 6,264,106 B1 | 7/2001 | Bridgelall |
| 6,265,976 B1 | 7/2001 | Roesner et al. |
| 6,272,321 B1 | 8/2001 | Bruhnke et al. |
| 6,275,681 B1 | 8/2001 | Vega et al. |
| 6,282,407 B1 | 8/2001 | Vega et al. |
| 6,285,295 B1 | 9/2001 | Casden |
| 6,286,762 B1 | 9/2001 | Reynolds et al. |
| 6,286,763 B1 | 9/2001 | Reynolds et al. |
| 6,293,467 B1 | 9/2001 | Reddersen et al. |
| 6,307,517 B1 | 10/2001 | Lee |
| 6,317,027 B1 | 11/2001 | Watkins |
| 6,318,636 B1 | 11/2001 | Reynolds et al. |
| 6,342,839 B1 | 1/2002 | Curkendall et al. |
| 6,354,493 B1 | 3/2002 | Mon |
| 6,362,738 B1 | 3/2002 | Vega |
| 6,366,206 B1 | 4/2002 | Ishikawa et al. |
| 6,377,176 B1 | 4/2002 | Lee |
| 6,377,203 B1 | 4/2002 | Doany |
| 6,392,544 B1 | 5/2002 | Collins et al. |
| 6,400,272 B1 | 6/2002 | Holtzman |
| 6,401,936 B1 | 6/2002 | Isaacs |
| 6,409,401 B1 | 6/2002 | Petteruti et al. |
| 6,415,978 B1 | 7/2002 | McAllister |
| 6,429,776 B1 | 8/2002 | Alicot et al. |
| 6,445,297 B1 | 9/2002 | Nicholson |
| 6,445,969 B1 | 9/2002 | Kenney |
| 6,448,886 B2 | 9/2002 | Garber et al. |
| 6,451,154 B1 | 9/2002 | Grabau |
| 6,476,708 B1 | 11/2002 | Johnson |
| 6,484,886 B1 | 11/2002 | Isaacs |
| 6,486,780 B1 | 11/2002 | Garber |
| 6,501,382 B1 | 12/2002 | Rehfus |
| 6,505,780 B1 | 1/2003 | Yassin et al. |
| 6,517,000 B1 | 2/2003 | McAllister et al. |
| 6,523,752 B2 | 2/2003 | Nishitani et al. |
| 6,529,880 B1 | 3/2003 | McKeen et al. |
| 6,547,040 B2 | 4/2003 | Goodwin, III |
| 6,549,064 B2 | 4/2003 | Bandy et al. |
| 6,554,187 B2 | 4/2003 | Otto |
| 6,563,425 B2 | 5/2003 | Nicholson et al. |
| 6,566,997 B1 | 5/2003 | Bradin |
| 6,585,165 B1 | 7/2003 | Kuroda |
| 6,593,853 B1 | 7/2003 | Barrett et al. |
| 6,600,418 B2 | 7/2003 | Francis et al. |
| 6,607,123 B1 | 8/2003 | Jollifee et al. |
| 6,608,551 B1 | 8/2003 | Anderson et al. |
| 6,608,561 B2 | 8/2003 | Lawler, Jr. et al. |
| 6,612,495 B2 | 9/2003 | Reddersen et al. |
| 6,617,962 B1 | 9/2003 | Horwitz et al. |
| 6,621,417 B2 | 9/2003 | Duncan et al. |
| 6,622,567 B1 | 9/2003 | Hamel et al. |
| 6,641,042 B1 | 11/2003 | Pierenkemper et al. |
| 6,650,227 B1 | 11/2003 | Bradin |
| 6,664,897 B2 | 12/2003 | Pape et al. |
| 6,669,089 B2 | 12/2003 | Cybulski et al. |
| 6,672,512 B2 | 1/2004 | Bridgelall |
| 6,677,852 B1 | 1/2004 | Landt |
| 6,687,293 B1 | 2/2004 | Loyer et al. |
| 6,693,539 B2 | 2/2004 | Bowers et al. |
| 6,700,931 B1 | 3/2004 | Lee et al. |
| 6,707,376 B1 | 3/2004 | Patterson et al. |
| 6,712,276 B1 | 3/2004 | Abali et al. |
| 6,714,121 B1 | 3/2004 | Moore |
| 6,724,308 B2 | 4/2004 | Nicholson |
| 6,726,099 B2 | 4/2004 | Becker et al. |
| 6,745,008 B1 | 6/2004 | Carrender et al. |
| 6,747,560 B2 | 6/2004 | Stevens, III |
| 6,750,769 B1 | 6/2004 | Smith |
| 6,752,277 B1 | 6/2004 | Sempliner |
| 6,784,789 B2 | 8/2004 | Eroglu et al. |
| 6,784,813 B2 | 8/2004 | Shanks et al. |
| 6,791,603 B2 | 9/2004 | Lazo et al. |
| 6,793,127 B2 | 9/2004 | Alsafadi et al. |
| 6,802,659 B2 | 10/2004 | Cremon et al. |
| 6,808,116 B1 | 10/2004 | Eslambolchi |
| 6,809,646 B1 | 10/2004 | Lee |
| 6,812,838 B1 | 11/2004 | Maloney |
| 6,828,902 B2 | 12/2004 | Casden |
| 6,842,106 B2 | 1/2005 | Hughes et al. |
| 6,847,856 B1 | 1/2005 | Bohannon |
| 6,853,294 B1 | 2/2005 | Ramamurthy et al. |
| 6,853,303 B2 | 2/2005 | Chen et al. |
| 6,859,757 B2 | 2/2005 | Muehl et al. |
| 6,870,797 B2 | 3/2005 | Reasoner et al. |
| 6,873,260 B2 | 3/2005 | Lancos et al. |
| 6,879,809 B1 | 4/2005 | Vega et al. |
| 6,888,459 B2 | 5/2005 | Stilp |
| 6,899,476 B1 | 5/2005 | Barrus et al. |
| 6,901,304 B2 | 5/2005 | Swan et al. |
| 6,903,656 B1 | 6/2005 | Lee |
| 6,917,291 B2 | 7/2005 | Allen |
| 6,918,541 B2 | 7/2005 | Knowles et al. |
| 6,929,412 B1 | 8/2005 | Barrus et al. |
| 6,940,408 B2 | 9/2005 | Ferguson et al. |
| 6,943,688 B2 | 9/2005 | Chung et al. |
| 6,967,579 B1 | 11/2005 | Elizondo |
| 6,992,574 B2 | 1/2006 | Aupperle |
| 6,999,955 B1 | 2/2006 | Horvitz |
| 7,057,509 B2 | 6/2006 | Gualdi et al. |
| 7,066,388 B2 | 6/2006 | He |
| 7,066,667 B2 | 6/2006 | Chapman et al. |
| 7,069,100 B2 | 6/2006 | Monette et al. |
| 7,073,712 B2 | 7/2006 | Jusas et al. |
| 7,079,023 B2 | 7/2006 | Haller |
| 7,183,922 B2 | 2/2007 | Mendolia et al. |
| 7,187,288 B2 | 3/2007 | Mendolia et al. |
| 7,195,159 B2 | 3/2007 | Sloan et al. |
| 7,212,637 B2 | 5/2007 | Salisbury |
| 7,230,730 B2 | 6/2007 | Owen et al. |
| 7,336,243 B2 | 2/2008 | Jo et al. |
| 2001/0000019 A1 | 3/2001 | Bowers et al. |
| 2001/0008390 A1 | 7/2001 | Berquist |
| 2002/0005774 A1 | 1/2002 | Rudolph |
| 2002/0130778 A1 | 9/2002 | Nicholson |
| 2002/0143320 A1 | 10/2002 | Levin |
| 2002/0165758 A1 | 11/2002 | Hind et al. |
| 2002/0167397 A1 | 11/2002 | Eroglu et al. |
| 2002/0185532 A1 | 12/2002 | Berquist et al. |
| 2003/0023337 A1 | 1/2003 | Godfrey et al. |
| 2003/0102367 A1 | 6/2003 | Monette et al. |
| 2003/0109951 A1 | 6/2003 | Hsiung et al. |
| 2003/0169149 A1 | 9/2003 | Ohki et al. |
| 2004/0024644 A1 | 2/2004 | Gui et al. |
| 2004/0032443 A1 | 2/2004 | Moylan |
| 2004/0061324 A1 | 4/2004 | Howard |
| 2004/0062294 A1 | 4/2004 | Clemens et al. |
| 2004/0066281 A1 | 4/2004 | Hughes et al. |
| 2004/0069851 A1 | 4/2004 | Grunca |
| 2004/0095910 A1 | 5/2004 | Metts et al. |
| 2004/0108378 A1 | 6/2004 | Gatz |
| 2004/0124988 A1 | 7/2004 | Leonard et al. |

| | | |
|---|---|---|
| 2004/0189443 A1 | 9/2004 | Eastburn |
| 2004/0220860 A1 | 11/2004 | Persky et al. |
| 2005/0012613 A1 | 1/2005 | Eckstein et al. |
| 2005/0021369 A1 | 1/2005 | Cohen et al. |
| 2005/0035849 A1 | 2/2005 | Yizhack |
| 2005/0040934 A1 | 2/2005 | Shanton |
| 2005/0052283 A1 | 3/2005 | Collins et al. |
| 2005/0058483 A1 | 3/2005 | Chapman et al. |
| 2005/0083180 A1 | 4/2005 | Horwitz |
| 2005/0088299 A1 | 4/2005 | Bandy et al. |
| 2005/0092825 A1 | 5/2005 | Cox et al. |
| 2005/0093678 A1 | 5/2005 | Forster et al. |
| 2005/0110641 A1 | 5/2005 | Mendolia et al. |
| 2005/0140511 A1 | 6/2005 | Bonnell et al. |
| 2005/0143916 A1 | 6/2005 | Kim et al. |
| 2005/0145688 A1 | 7/2005 | Milenkovic et al. |
| 2005/0149414 A1 | 7/2005 | Schrodt et al. |
| 2005/0154572 A1 | 7/2005 | Sweeney |
| 2005/0155213 A1 | 7/2005 | Eastin |
| 2005/0159913 A1 | 7/2005 | Ariyoshi et al. |
| 2005/0162256 A1 | 7/2005 | Kinoshita |
| 2005/0170784 A1 | 8/2005 | Ariyoshi et al. |
| 2005/0177423 A1 | 8/2005 | Swanson |
| 2005/0179521 A1 | 8/2005 | Pillai et al. |
| 2005/0180566 A1 | 8/2005 | Ryal |
| 2005/0190098 A1 | 9/2005 | Bridgelall et al. |
| 2005/0200457 A1 | 9/2005 | Bridgelall et al. |
| 2005/0206552 A1 | 9/2005 | Friedrich |
| 2005/0206555 A1 | 9/2005 | Bridgelall et al. |
| 2005/0212660 A1 | 9/2005 | Hansen et al. |
| 2005/0212673 A1 | 9/2005 | Forster |
| 2005/0212676 A1 | 9/2005 | Steinberg |
| 2005/0219039 A1 | 10/2005 | Edwards |
| 2005/0228528 A1 * | 10/2005 | Farchmin et al. ............ 700/116 |
| 2005/0253718 A1 | 11/2005 | Droms et al. |
| 2005/0258955 A1 | 11/2005 | Gloekler et al. |
| 2005/0269407 A1 | 12/2005 | Harmon |
| 2006/0006231 A1 | 1/2006 | Anson et al. |
| 2006/0027658 A1 | 2/2006 | Genc et al. |
| 2006/0038077 A1 | 2/2006 | Olin et al. |
| 2006/0071774 A1 | 4/2006 | Brown et al. |
| 2006/0145850 A1 | 7/2006 | Krstulich |
| 2006/0170565 A1 * | 8/2006 | Husak et al. ............ 340/572.1 |
| 2006/0208859 A1 | 9/2006 | Hougen et al. |
| 2007/0008073 A1 | 1/2007 | Poasevara |
| 2007/0013517 A1 * | 1/2007 | Posamentier ............ 340/572.1 |
| 2007/0013519 A1 | 1/2007 | Chung et al. |
| 2007/0040681 A1 | 2/2007 | Jessup |
| 2007/0159311 A1 | 7/2007 | Schober |
| 2007/0205860 A1 | 9/2007 | Jones et al. |
| 2007/0205861 A1 | 9/2007 | Nair et al. |

FOREIGN PATENT DOCUMENTS

| | | |
|---|---|---|
| EP | 1542105 A | 6/2005 |
| WO | 0016289 | 3/2000 |
| WO | 0058752 | 10/2000 |
| WO | 0169516 | 9/2001 |
| WO | 02073523 | 9/2002 |
| WO | 03056403 A | 7/2003 |
| WO | 03056469 A | 7/2003 |
| WO | 2005045743 A | 5/2005 |

OTHER PUBLICATIONS

Partial International Search Report dated Mar. 30, 2006, for PCT Application Serial No. PCT/EP2005/007878, 3 pages.

European Search Report dated Feb. 6, 2006 mailed Feb. 20, 2006 for European Patent Application Serial No. 10/985,173, 3 Pages.

M. Karkkainen, et al.: "The product centric approach: a solution to supply network information management problems?" Computers in Industry, Elsevier Science Publishers. Amsterdam, NL, vol. 52, No. 2, Oct. 2003.

European Search Report dated Feb. 14, 2006 mailed Feb. 20, 2006 for European Patent Application Serial No. 10/985,621, 3 Pages.

International Search Report for PCT Appliction No. PCT/US06/34290, mailed Feb. 5, 2008, 2 pages.

* cited by examiner

INTELLIGENT RFID TAG FOR MAGNETIC FIELD MAPPING

TECHNICAL FIELD

The following description relates generally to radio frequency identification (RFID) systems and more specifically, to systems and methods that improve accuracy and increase efficiency of RFID systems.

BACKGROUND OF THE INVENTION

Radio Frequency Identification (RFID) technology leverages electronic data and wireless communication for identification purposes. With RFID systems, electronic data typically is stored within an RFID tag, which can be formed from a small silicon chip and one or more antennas, and affixed to a product. Reading from and/or writing to an RFID tag can be achieved through radio frequency (RF) based wireless communication via devices referred to as RFID readers. In general, writing is utilized to add and/or modify product-specific information to an RFID tag, and reading is utilized to retrieve the information, for example, to provide for automatic product identification. In many instances, the electronic data written to and/or read from an RFID tag includes an Electronic Product Code (EPC), which, in general, is a unique number that is encoded (e.g., as a bit code) and embedded within the RFID tag. Typical EPC data can include information about the associated product (e.g., product type, date of manufacture, lot number, . . . ) and/or associated pallets, boxes, cases and/or container levels, for example.

When passed through or scanned by a reader, an RFID tag emits stored electronic data such that the data can be retrieved by an RFID reader without unpacking the product or scanning barcode labels. Read information can be utilized to provide a greater degree of certainty over what goes into a supply chain and/or how to manage raw materials, warehouse inventory, shipments, logistics, and/or various other aspects of manufacturing.

One of the challenges associated with applying RFID technology is the uncertainty of whether an RFID reader antenna(s) cover the reading/writing area of a given RFID target. Since the magnetic field of an antenna is not visible, the coverage area is generally roughly estimated when positioning the antenna and it is difficult to determine and measure the signal strength without expensive tools (e.g., spectrometer equipment). Additional challenges are associated with pallet applications where there is a need to read multiple (e.g., 100 or more) RFID tags at substantially the same time. Some of the tags may be buried in the middle of a pallet with no way to physically access the tag without removing the other products on the pallet. Without a means to measure the strength of the magnetic field it is unknown if all the RFID tags on the pallet are being read. Accordingly, there is an unmet need in the art for an improved RFID system to increase system accuracy and efficiency.

SUMMARY OF THE INVENTION

The following presents a simplified summary of the invention in order to provide a basic understanding of some aspects of the invention. This summary is not an extensive overview and it is not intended to identify key/critical elements or to delineate the scope of the invention. Its sole purpose is to present some concepts in a simplified form as a prelude to the more detailed description that is presented later.

The invention disclosed and claimed herein, in one aspect thereof, comprises an RFID system that includes an RFID component, which receives a signal from an RFID reader, and an identifier component that interfaces with the RFID component and identifies the source of the signal. The system further includes a signal strength component that interfaces with the identifier component and measures the strength of the signal. Further included is a signal measurement component at the RFID reader that measures a voltage level associated with a signal received from the RFID tag.

According to another aspect thereof, a methodology of improving RFID accuracy is disclosed. The method includes receiving a signal from an RFID reader, analyzing a parameter associated with the signal, and mapping a magnetic field based at least in part on the parameter. The method can further include adjusting a signal strength based upon the parameter and/or the mapped magnetic field.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject disclosure is intended to include all such aspects and their equivalents. Other advantages and novel features will become apparent from the following detailed description of the invention when considered in conjunction with the drawings.

DESCRIPTION OF THE INVENTION

Figure 1:
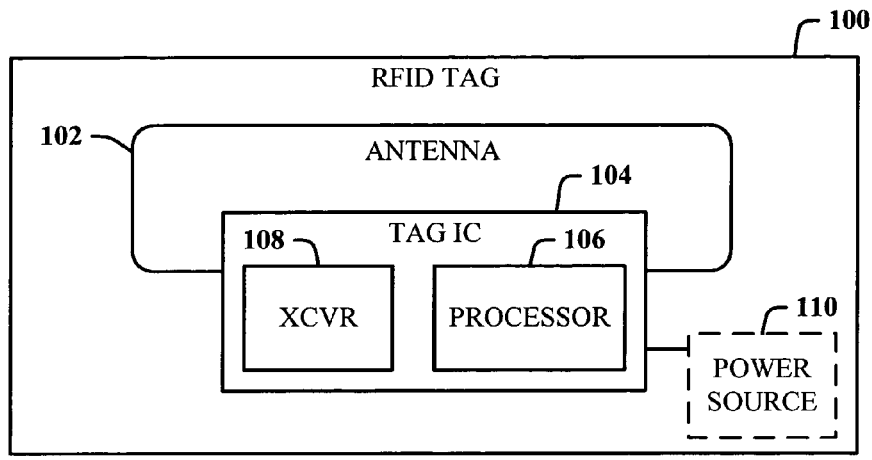
FIG. 1 illustrates an intelligent RFID tag in accordance with the subject invention.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the terms "infer" and "inference" refer generally to the process of reasoning about or inferring states of the system, and/or environment from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

FIG. 1 illustrates an intelligent RFID tag 100 in accordance with the subject invention. The tag 100 can include a single antenna 102 (or multiple antennas) (denoted ANTENNA) that facilitates communicating signals and data with an RFID reader (or reader/writer) (not shown). The tag 100 also includes a tag IC 104 that provides onboard processing of the data and signals. In support thereof, the tag IC 104 further includes a processor 106 (e.g., a digital signal processor-DSP) that facilitates data and signal processing and storage, and a transceiver 108 that interfaces to the antenna 102 for communications of the data and signals. The tag 100 can be an active tag, such that a power source 110 (e.g., a coin cell, capacitor) is provided. Alternatively, the tag 100 is passive, whereby the power source 110 is not provided.

Figure 2:
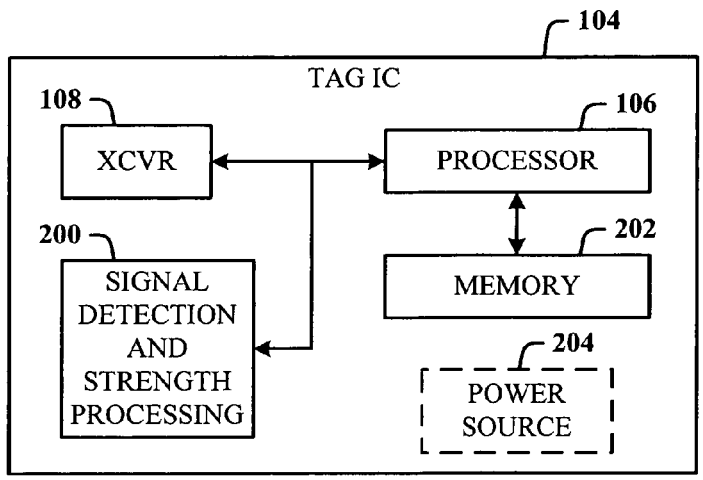
FIG. 2 illustrates a more detailed diagram of an implementation of the tag IC of FIG. 1, in accordance with the invention.

The tag 100 is capable of operating in a multi-frequency band environment such that a first set of readers operate on a first frequency band and a second set of readers operate on a second frequency band. Accordingly, FIG. 2 illustrates a more detailed diagram of an implementation of the tag IC 104 of FIG. 1, in accordance with the invention. The tag IC 104 includes the transceiver 108 that interfaces the antenna 102 (of FIG. 1) to the processor 106. The transceiver 108 also interfaces to a signal detection and strength processing block 200 that facilitates signal strength processing onboard the tag IC 104 in accordance with the invention. The block 200 interfaces to the processor 106 such that multi-band data and signal processing can be performed. Accordingly, when a reader transmits a signal, the tag IC 104 receives the signal via the transceiver 108 into the signal detection and strength processing block 200, wherein the signal frequency is discriminated and processed for signal strength data. Additionally, as described above, the signal can include reader identification (ID) data that uniquely identifies the reader. Thus, once the signal strength data (or environmental data such as temperature, pressure, vibration, etc.) is computed, the signal strength (or other) data and the reader ID data can be stored on the tag IC 104 in a memory 202, and/or transmitted via the transceiver 108 to an external system (e.g., the reader and/or a controller), which is not shown. As multiple tags respond, the field can be mapped for a given area. The tag IC 104 can also include an optional onboard power source 204 that provides power in an active transponder tag implementation.

Figure 3:
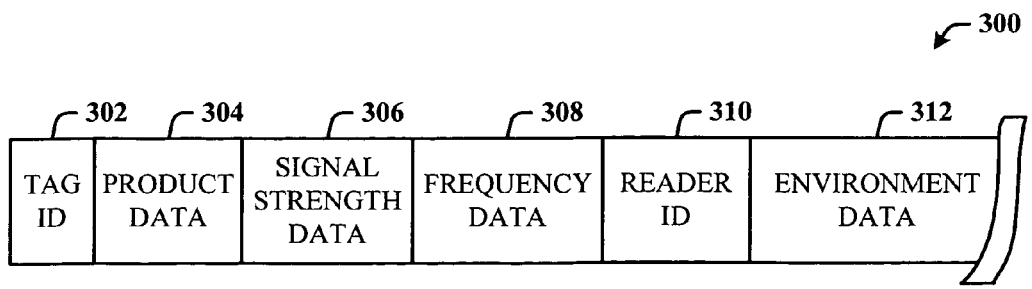
FIG. 3 illustrates an exemplary RFID data packet that includes signal strength data which can be communicated in accordance with the invention.

FIG. 3 illustrates an exemplary RFID data packet 300 that includes signal strength data which can be communicated in accordance with the invention. The packet 300 can include a tag ID 302 that uniquely identifies the tag; however, this is not a requirement. Product data 304 is included that describes the product to which the RFID tag is attached or associated. The packet 300 can also include signal strength data 306 that was computed on the tag for a given reader. Frequency data 308 can also be provided the identifies the frequency (or frequency band, e.g., about a 915 MHz band) on which the associated signal strength data was calculated; however, this is not required, since reader ID data 310 can be received from the reader from which the generated frequency can be known. Environmental data 312 can also be communicated, since the tag IC can interface to one or more environmental sensors (e.g., temperature, pressure, humidity, shock, vibration, . . . ). Other data can also be communicated via the packet 300, according to the particular application.

Figure 4:
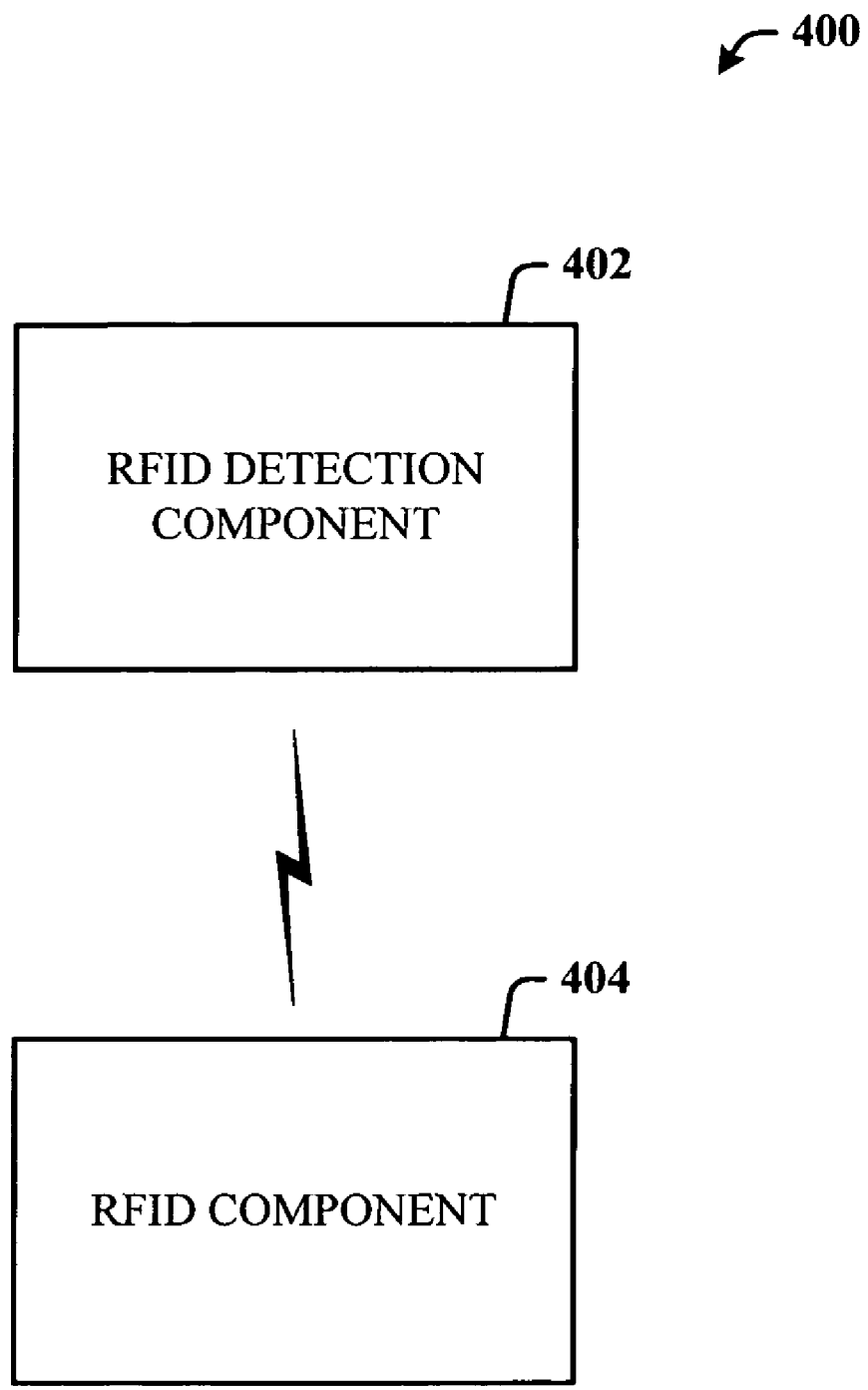
FIG. 4 illustrates an RFID (Radio Frequency Identification) system in accordance with the subject invention.

FIG. 4 illustrates an RFID (radio frequency identification) system 400 that manages electronic product information (or data) within an industrial control system. The system 400 includes an RFID detection component 402 that interfaces with a RFID component 404 via wireless communications. The RFID detection component 402 can be various components that read, write, receive, and/or store electronic product data, such as, readers, writers and/or servers, and can be a handheld device or a fixed-mount device depending on the particular application. The RFID detection component 402 can broadcast a signal or radio waves via an antenna or a plurality of antennas (not shown). The antenna for a particular device may be of various types suitable for use in a wireless communications system, such as a dipole antenna, a yagi-type antenna, etc. The coverage area or signal range of the RFID detection component 402 can be anywhere from about one inch to about one hundred feet or more, depending upon the radio frequency used and the power output. The frequency range of the RFID system 400 can be a low-frequency range (e.g., from about 30 KHz to about 500 KHz), an intermediate-frequency range (e.g., about 10 MHz to about 15 MHz) or a high-frequency range, (e.g., from about 850 MHz to about 950 MHz and about 2.4 GHz to about 2.5 GHz). Higher frequency ranges offer longer read ranges (e.g., about 90 feet or more) and higher reading speeds. The signal can be continuously transmitted or periodically transmitted, such as when activated by a sensor device.

The RFID detection component 402 is operative to transmit a signal to the RFID component 404 and vice versa. Upon receiving the signal, the RFID component 404 transmits a reply signal that is sent to and received by the RFID detection component 402. The RFID component 404 can be an active or passive RFID tag. The bi-directional signal transmission operates in similar manner for both passive and active tags. Active RFID tags contain an internal battery or other suitable power source and are typically read/write devices. That is to say, the tag data can be rewritten and/or modified. The memory size of an active tag can vary depending on the application requirements and, since it is powered onboard, it generally has a longer or wider read range or coverage area than a passive tag. Passive tags do not typically have an internal power source and obtain power generated by a reader.

Passive tags can be read/write devices or read-only devices. A read-only tag is generally programmed with a unique set of data that, in one implementation, cannot be modified, and in another implementation, can be modified. A difference between an active device and a passive device is the signal range. Passive tags can be limited to a few meters because the RFID detection component 402 supplies the power to the tag via RF and is the only power supplied to the tag. Active tags can be read over hundreds of meters because they have an internal power supply. An example of a passive tag is a tag on a box of detergent in a department store. An active tag can be utilized, for example, at toll booths on the turnpike to determine which car is passing through the booth for later billing purposes.

At about a substantially similar time as the RFID component 404 is activated through the magnetic field of an antenna of the RFID detection component 402, the RFID measures its field strength by measuring the voltage received from the RF field from the RFID detection component 402. The RFID component 404 adds the voltage value to the end of the tag data as extra data that it will send to the RFID detection component 402.

The RFID detection component 402 transmits a signal that specifies a range of tags to respond. Only the tags within this range should respond. If multiple tags respond, the RFID detection component 402 can specify a shorter range until the desired tag or number of tags respond. The RFID detection component 402 cycles through the sequence looking for additional tags.

The RFID component 404 can also provide a means to measure the strength of the received signal. Transmitting data between the RFID detection component 402 and the RFID component 404 is subject to obstructions and influences on the transmitting media, e.g., air interference. Noise interference and distortion arise frequently and should be mitigated to achieve virtually error free data recovery. By measuring and recording the signal strength not only can the range of the RFID detection component 402 be determined but also obstructions which are interfering with the signal can be located especially when there is an observed change in the signal strength. There are at least two signal strength measurements; the signal strength at the RFID component 404 and the signal strength at the RFID detection component 402. Additional criteria that can affect the signal can also be measured, analyzed, and/or recorded such as environmental data.

Analysis of the data can indicate if a physical adjustment of the antenna(s) is required to improve the efficiency and/or accuracy of the system 400. Analysis can also determine if there should be an electronic adjustment of the signal strength of the antennas/readers for the given RFID reading area. This process can be repeated after each adjustment to facilitate configuration improvement in the coverage of the RFID antennas and the entire system 400.

Figure 5:
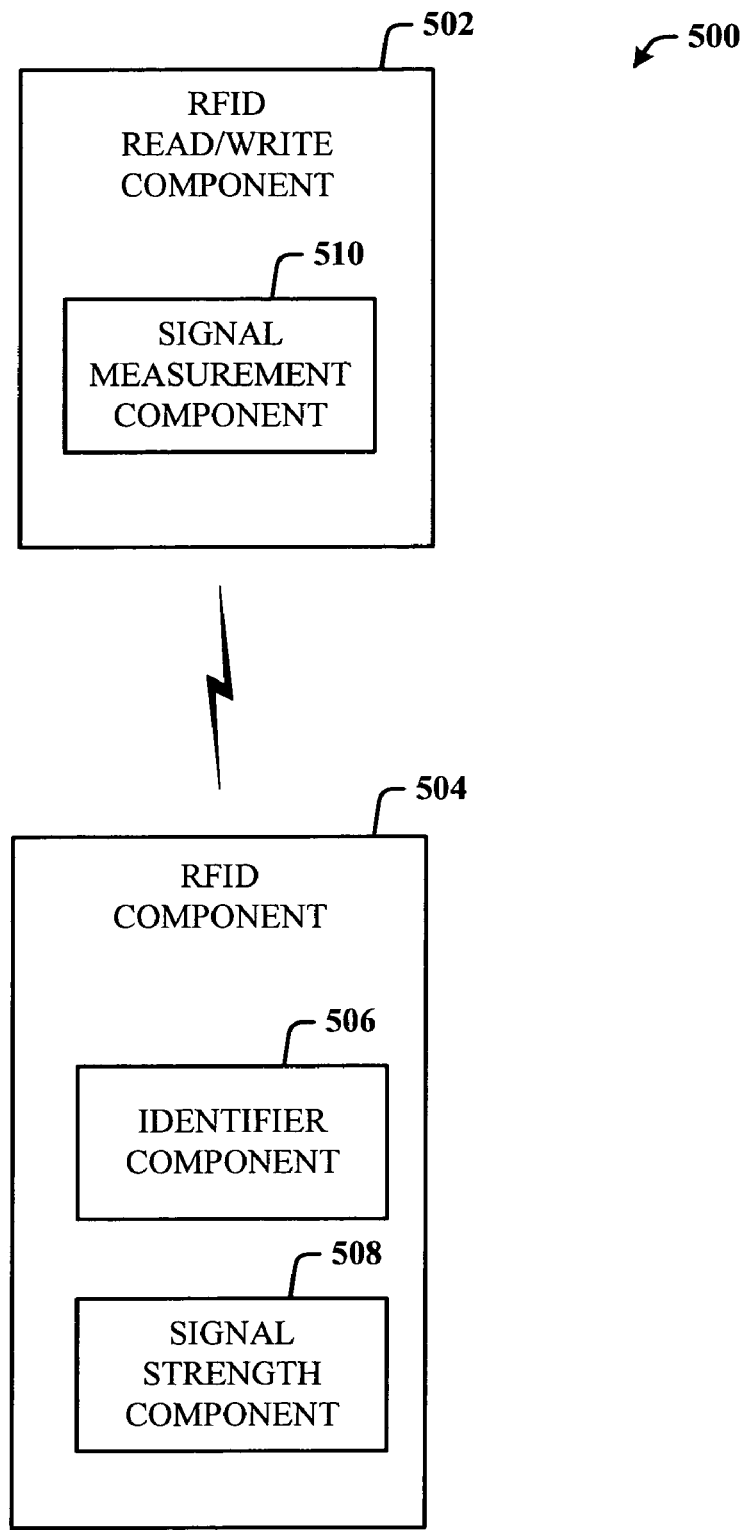
FIG. 5 illustrates an RFID system in accordance with another aspect of the invention.

With reference now to FIG. 5, illustrated is an RFID system 500 that includes an RFID read/write (R/W) component 502 operatively interfaced with an RFID component 504 that includes an identifier component 506 and a signal strength component 508. The RFID R/W component 502 can include a signal measurement component 510. While only one RFID R/W component 502 and one RFID component 504 are illustrated, it is to be appreciated that more than one of either or both components can be utilized in accordance with the invention. It is also to be appreciated that while the combined functionality of an RFID R/W provides a more robust implementation, the system 500 can employ strictly an RFID reader or strictly an RFID writer without departing from the scope of the invention.

The RFID R/W component 502 emits a radio signal via an antenna (not shown) to activate and/or read and/or write data to the RFID component 504. The antenna can be of a size and/or shape suitable for the desired application, and there may be more than one antenna operatively associated with the RFID R/W component 502. Radio waves in the RFID system 500 can range anywhere from about one inch to about one hundred feet or more, depending upon the power output of the RFID R/W component 502, the radio frequency, and operating conditions (e.g., physical obstructions, weather, . . . ).

When the RFID component 504 passes through the electromagnetic field of the RFID WJW component 502, an antenna (not shown) associated with the RFID component 504 receives the RFID R/W component 502 activation signal. An identifier component 506, associated with the RFID component 504, is able to identify the particular RFID R/W component 502 from which the signal was broadcast. For example, the RFID R/W component 502 may broadcast a signal with identifying data, such as a unique identifier. The identifier component 506 is capable of associating the received signal with the exact RFID R/W 502 that sent the signal based, at least in part, on the unique identifier.

The RFID component 504 further includes a signal strength component 508 that measures the strength of a received signal. The signal strength can be determined by measuring the voltage received from the RF field generated by the RFID R/W component 502. The measured voltage is added, generally at the end, to the tag data as extra information. Amalgamating the signal information with information of the identifier component 506 links the signal with a specific RFID R/W component 502. The RFID R/W component 502 includes a signal measurement component 510 that is configured to measure the strength of the signal received from the RFID component 504.

By way of example and not limitation, three detection components receive a signal from a single R/W reader. A first detection component receives a strong signal, a second detection component receives a weak signal, and a third detection component receives a moderate strength signal. By mapping the location of the respective detection components and identifying the specific RFID R/W reader that sent the signal corresponding reading areas can be ascertained, and problems regarding antenna orientation and/or obstructions in the reading area can be mitigated through further system processing. This information can further be utilized to determine where an RFID component is in relation to the R/W reader, such as which RFID component is the closest to the R/W reader.

Figure 6:
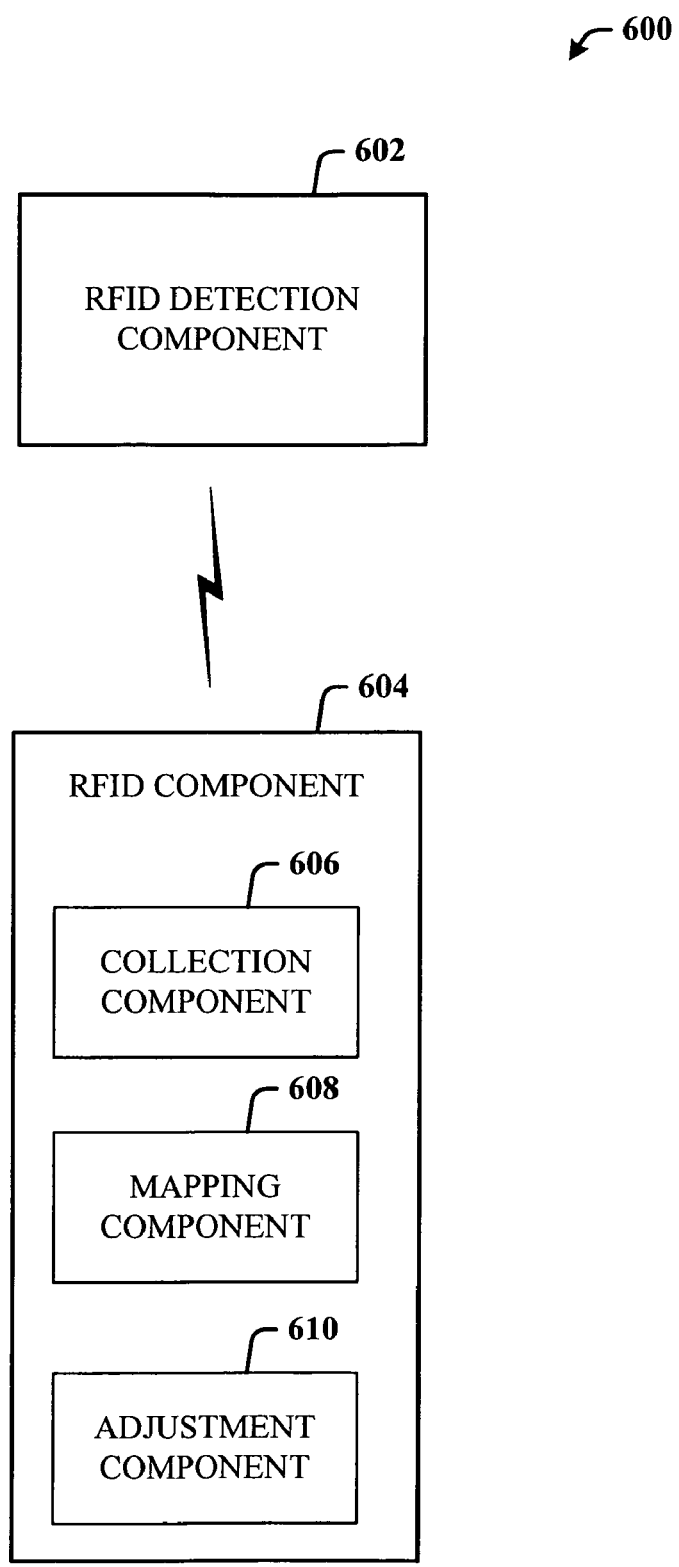
FIG. 6 illustrates an RFID system that employs collection and mapping techniques to improve system accuracy.

FIG. 6 illustrates an RFID system 600 that employs collection and mapping techniques that improve system accuracy and efficiency. The system 600 includes an RFID detection component 602 that emits a signal, and an RFID component 604 that receives the emitted signal via respective antennas (not shown). The RFID component 604 includes a collection component 606 that interfaces with a mapping component 608 and an adjustment component 610.

The RFID detection component 602 transmits a signal requesting RFID component 604 information. The RFID detection component 602 can be an RFID reader, and RFID writer, or an RFID reader/writer. The signal sent to the RFID component 604 has an associated identifier by which the RFID detection component 602 can be identified. The identifier can be a unique name, a number such as a serial number and/or unique component number, or any type of information that can be transmitted wirelessly to allow recognition and identification. At a substantially similar time as the emitted signal is received by an antenna operatively coupled to the RFID component 604, information associated with that signal is collected by the collection component 606. For example, the collection component 606 can detect, measure, calculate, and/or receive data associated with the source of the emitted signal based at least in part on the associated identifier.

The collection component 606 can further measure, calculate, detect, and/or receive information regarding the strength of the received signal and its associated RFID detection component 602. The strength of the signal is an indication of the reading range of the RFID detection component 602. The field or range of the signal or radio wave delivered by the RFID detection component 602 extends into the space surrounding it and the strength of the wave diminishes with respect to distance. That is to say, the greater the distance between the RFID detection component 602 and the RFID component 604, the weaker the signal strength received by the RFID component 604. The antenna design determines the shape of the field or wave delivered, and the range is also influenced by the angle between the RFID detection component 602 and the RFID component 604. If there are no obstructions or mechanisms that absorb the signal, the strength of the field is reduced in inverse proportion to the square of the distance that it travels.

At higher frequencies the absorption of the signal due to moisture, for example, influences the range. For example, at 13.56 MHz the signal is not absorbed by water (moisture) or human tissue. However, it will be understood by those having ordinary skill in the art that the subject disclosure works equally well at any frequency range including the EPC 900 MHz Class 0 RFID Tag Specification which operates about a 900 MHz band, an 860-930 MHz Class 1 RFID tag RF and Logical Communication Interface Specification, and a 13.56 MHz ISM Band Class 1 RFID Tag Interface Specification. It is to be understood that other frequency ranges, including yet to be defined RFID (EPC) standards, can work equally well with the embodiments disclosed herein. Through analysis of both the specific RFID detection component 602 that sent the signal and the signal strength as received by the RFID component 604 modifications can be made to increase the accuracy and coverage area of the system 600.

The collection component 606 interfaces with the mapping component 608 that facilitates determination of the RFID reading area. The mapping component 608 obtains and/or calculates a location of the RFID component 604 and using this information together with information received from the collection component 606 can map a reading area of the RFID detection component 602. Based upon the mapped reading area, the adjustment component 610 that interfaces with the mapping component 608 can recommend a physical adjustment to an antenna, or it may autonomously adjust the antenna. The adjustment component 610 can further electronically adjust the signal strength of the antennas/readers to the given RFID reading area. If any adjustments are performed, the process can be repeated to introduce further modifications that improve the accuracy and efficiency of the RFID system 600.

Figure 7:
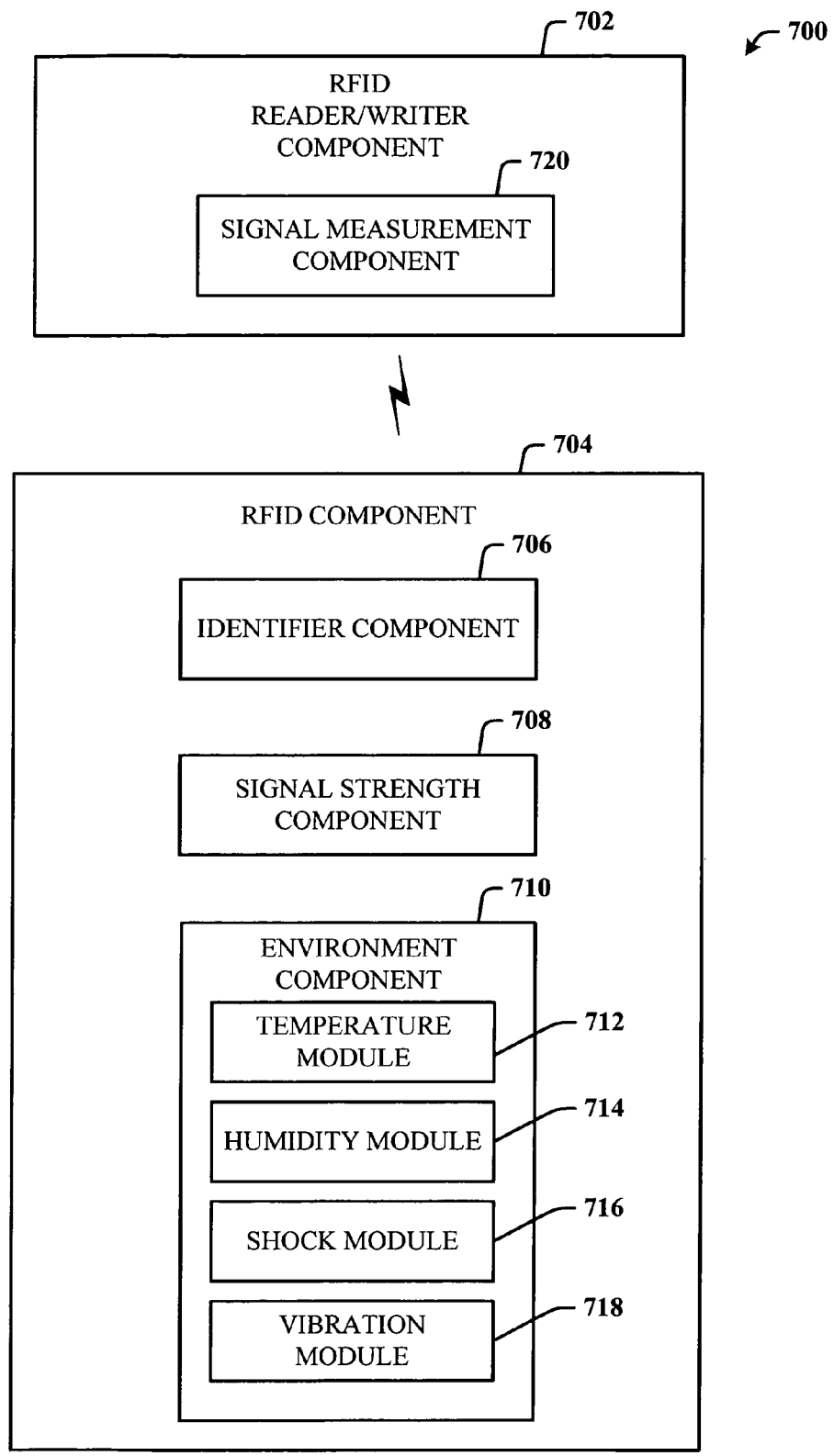
FIG. 7 illustrates an RFID system that monitors an external and/or internal operating environment.

FIG. 7 illustrates another embodiment of an RFID system 700 wherein the operating environment of the system and signal strength is analyzed. The strength and accuracy of the system is a component of the signal reaching its intended destination with sufficient strength to be detected. Many obstructions and/or operating conditions (both internal and external) can influence the accuracy and performance of the RFID system 700 and thus can be monitored, considered, and taken into account to ensure the highest and most accurate system 700 performance.

The system 700 includes an RFID R/W component 702 that interfaces with an RFID component 704. The RFID component 704 includes an identifier component 706 that identifies which RFID R/W component 702 signal was received and a signal strength component 708 that measures the strength of the received signal and includes the measured signal as extra data included in the response signal returned to the RFID R/W component 702. The RFID component 704 further includes an environment component 710 that measures, senses, calculates and/or determines an operating environment and/or operating condition(s) of the system 700. The environment component 710 can track internal, as well as external conditions of the system 700, including controllable conditions (e.g., antenna orientation) and uncontrollable conditions (e.g., weather). The environment component 710 can include a plurality of modules that record information at substantially the same time as a signal is received or detected by the RFID component 704.

By way of example and not limitation, two uncontrollable conditions include air temperature and humidity. Thus, the RFID component 704 can include a temperature module 712 that records the air temperature and a humidity module 714 that detections the presence or absence of water in the surrounding air space. Both the temperature information and the humidity information can be taken into account when the reading area of the RFID R/W component 702 is mapped because these uncontrollable influences will affect the transmission signal and may be the cause of signal interferences.

Illustrations of potentially controllable influences that can be monitored by the environment component 710 includes shock and vibration via a shock module 716 and a vibration module 718. As a product and its associated RFID tag is moved manually, automatically, by conveyor, etc., the RFID tag moves in and out of reading areas of respective RFID R/W components. Due to the movement there is some vibration associated with the product; however, too much vibration and/or shock may indicate system 700 problems.

Another example is if products are being moved via a conveyor belt and the shock module 716 detects a sudden and/or large movement of the product it may indicate a problem unrelated to the RFID system. Shock, excessive vibration and/or large movement of the products may indicate wear and/or failures associated with the mechanical components of the conveyor such as motor(s), transmission(s), roller(s), etc. In such a way, entire system failures can be diagnosed and corrected before a major catastrophe. The vibration module 718 can detect normal vibration as well as excessive vibration that indicate problems associated with the movement of the product(s). If the vibration module 718 detects that all vibration has ceased, but the part is still in a movement phase, the RFID component 704 can transmit a notification signal that there may be a problem with the system 700.

The additional components or sensors included on the RFID component 704 can detect the environment around the RFID tag in addition to measuring signal strength. By way of illustration and not limitation, the RFID component 704 can be on a box that contains frozen food. It is important to maintain the temperature of the food below the freezing point. Thus, the temperature can easily be collected and communicated. If the temperature was ever at a level above freezing, it can be readily determined and the frozen food can be removed, discarded, or processed in any manner desired.

The information measured, received or obtained by the RFID tag is added to the tag data and transmitted to the RFID R/W component 702. A signal measurement component 720 of the RFID R/W component 702 measures the signal received from the RFID component 704 to determine a magnetic field.

Figure 8:
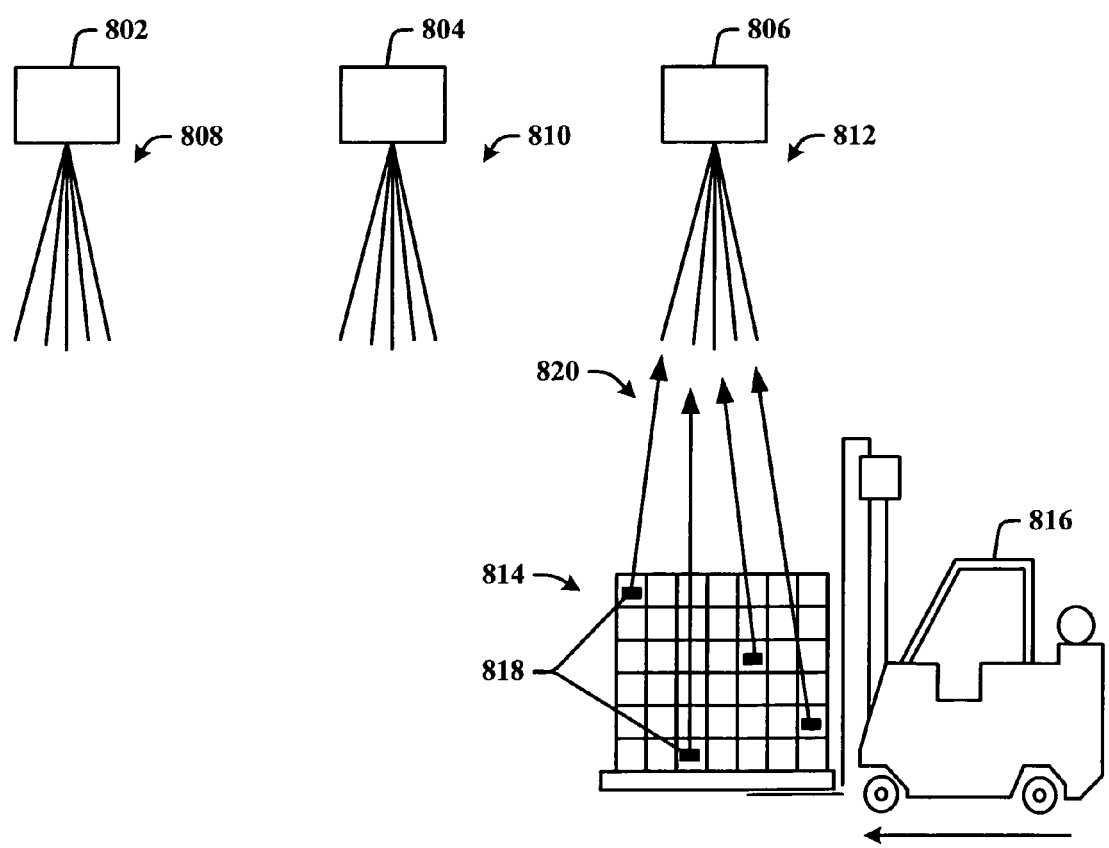
FIG. 8 illustrates an application of an RFID system in accordance with at least one aspect of the invention.

FIG. 8 illustrates an application of an RFID system in accordance with at least one aspect of the invention. A plurality of RFID R/W devices (a first reader 802, a second reader 804, and a third reader 806) are employed to detect the presence of a plurality of RFID tags. While the RFID devices (802, 804, and 806) are shown as overhead devices, it should be understood that the devices can be located anywhere, provided the range of coverage is appropriate for the particular purpose. For example, the devices (802, 804, and 806) can be underneath, on the side and or in various locations throughout the environment. Each of the RFID R/W devices (802, 804, and 806) transmits respective signals (808, 810, and 812) that can be constant, intermittent, or periodically transmitted, such as when activated by a sensor device.

As a pallet of products 814 is moved (e.g., by a forklift 816 or other suitable transport means), the products move within the read range of the third RFID R/W reader 806. RFID tags associated with respective products, a few of which are illustrated at 818, are activated by the corresponding emitted signal 812, and respond via respective return signals 820 communicated to the third RFID R/W device 806. As the forklift 816 and associated pallet of products 814 move through the environment, the products enter the range of the other RFID R/W devices (802 and 804), and the associated return signals will be transmitted in a similar manner. As the pallet of products 814 is moving, the RFID tags are constantly activated (for passive devices) and providing information (for both passive and active) concerning at least one parameter associated with the RFID R/W device (e.g., signal strength, origin, and/or operating conditions.

While FIG. 8 illustrates products being moved by a truck, it will be appreciated that the invention works equally well in other applications such as a conveyor line, manual movement of goods, etc. In addition, products can be located in a plurality of locations and do not have to be moved as a single unit of products.

Figure 9:
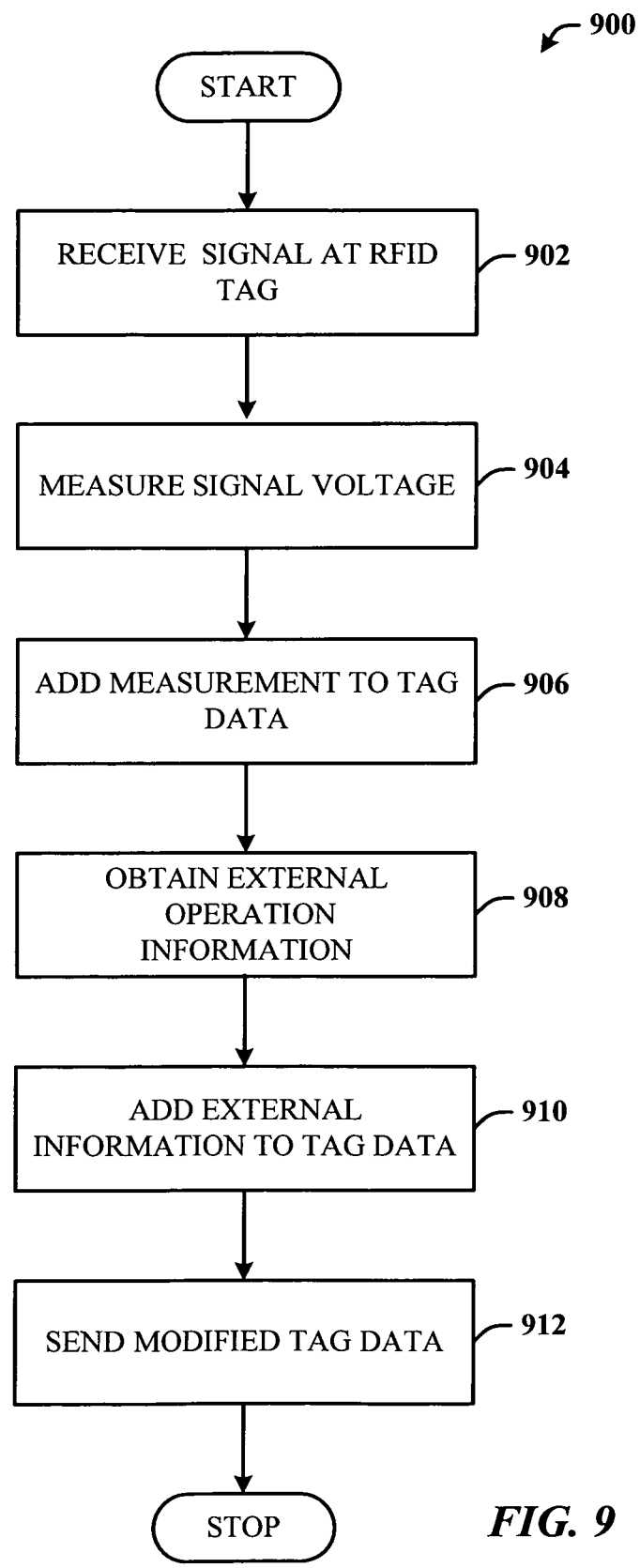
FIG. 9 is a methodology for optimizing the performance of an RFID system.

FIG. 9 illustrates a methodology 900 for optimizing performance of an RFID system. While, for purposes of simplicity of explanation, the one or more methodologies shown herein, e.g., in the form of a flow chart or flow diagram, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

The method starts at 902 when a signal is received by an RFID tag from, for example, an RFID (R/W) component. The signal can be broadcast to a plurality of RFID tags continuously, intermittently, or periodically depending on the system requirements. For example, the signal may be broadcast once every five seconds requesting information from RFID tag(s) that may have received the signal.

At 904, the received signal is analyzed by the RFID tag. A magnetic field can be mapped based upon the strength of the signal, wherein a weak signal indicates the RFID R/W device and RFID tag are located farther apart and/or there is some obstruction blocking or interfering with the magnetic field. The signal strength is obtained by measuring the voltage received from the RFID R/W component. At 906, the measured voltage and/or data representative of the voltage is added, as extra information, to the end of the tag data that is sent to the RFID R/W component. The RFID tag can also obtain other information, such as signal origin and/or operating conditions at 908. This information is included in the tag data, at 910, generally at the end, and is extra information. At 912, the RFID tag transmits the tag data and any extra information to the RFID R/W component.

Figure 10:
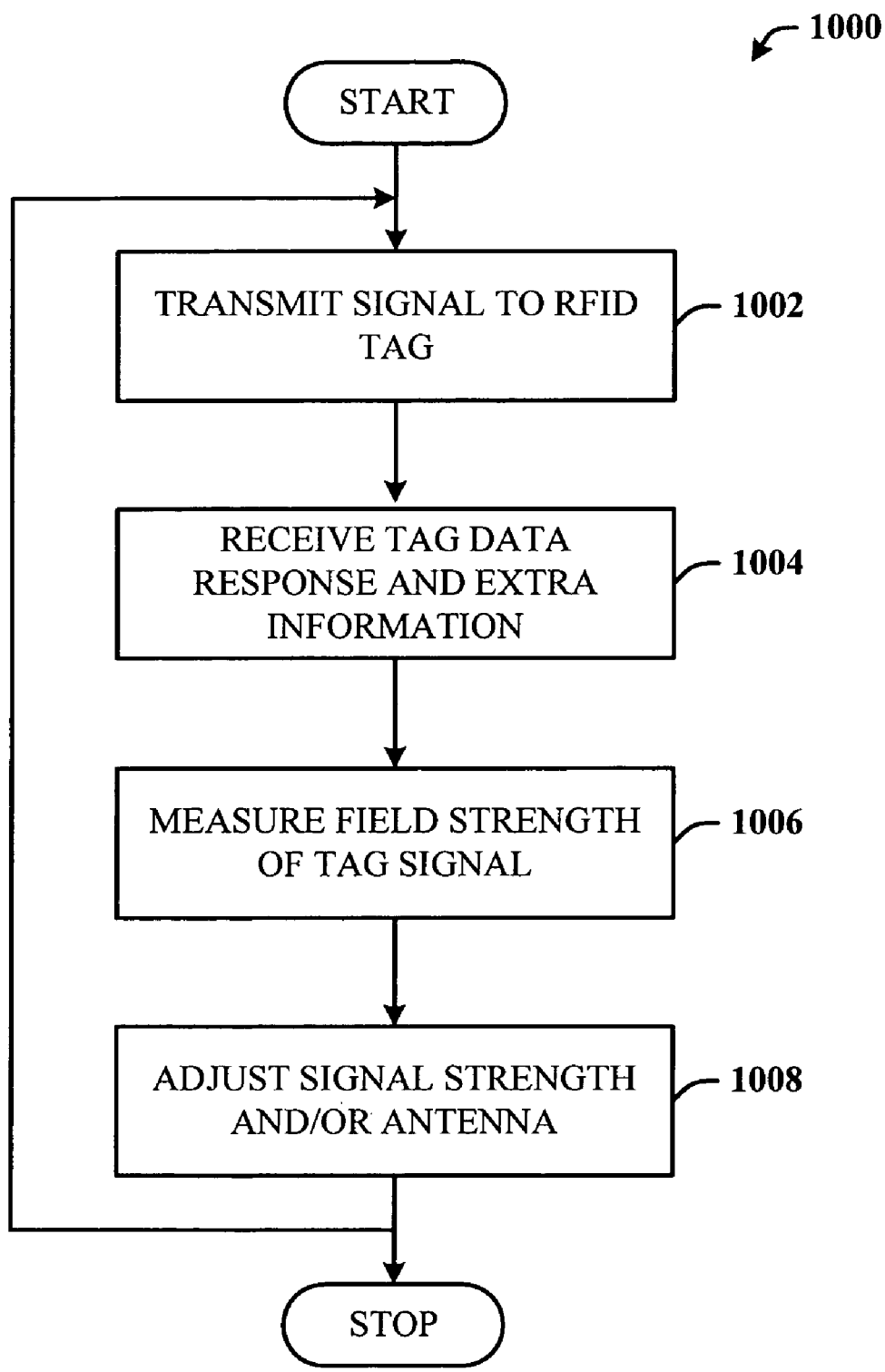
FIG. 10 illustrates a methodology for utilizing an intelligent RFID tag to obtain signal strength and environment information.

With reference now to FIG. 10, illustrated is a methodology 1000 for utilizing an intelligent RFID tag to obtain signal strength and environment information. The method begins at 1002 where a signal is sent to one or more intelligent RFID tags. The signal generally specifies a range of tags that should respond to the signal. The tags within the requested range respond at 1004. If multiple tags respond, a smaller range is specified until only one tag responds and can be identified. The response from the one or more tags includes tag data, signal or field strength measurement, and optional other information, such as temperature, humidity, shock, etc. The detection component sends another signal at 1002 looking for additional tags until no tags respond. The signal or field strength of the tag response is obtained, at 1006, by measuring the voltage received from the tag. This information can be utilized to map the magnetic field.

The methodology continues at 1008 where, based upon the results of the mapping of the magnetic field, an adjustment of the signal strength, antenna, or both is performed. The adjustment can be a recommendation of a physical adjustment to the antenna, whereby a controller associated with the RFID R/W device outputs a recommended action to a user. The adjustment can be autonomous whereby the system electronically adjusts the signal strength without any user interface. After any adjustments are made and/or periodically, the method can return to 1002 and repeats the methodology as many times as necessary to achieve a predetermined system accuracy and/or to continually monitor system accuracy.

Figure 11:
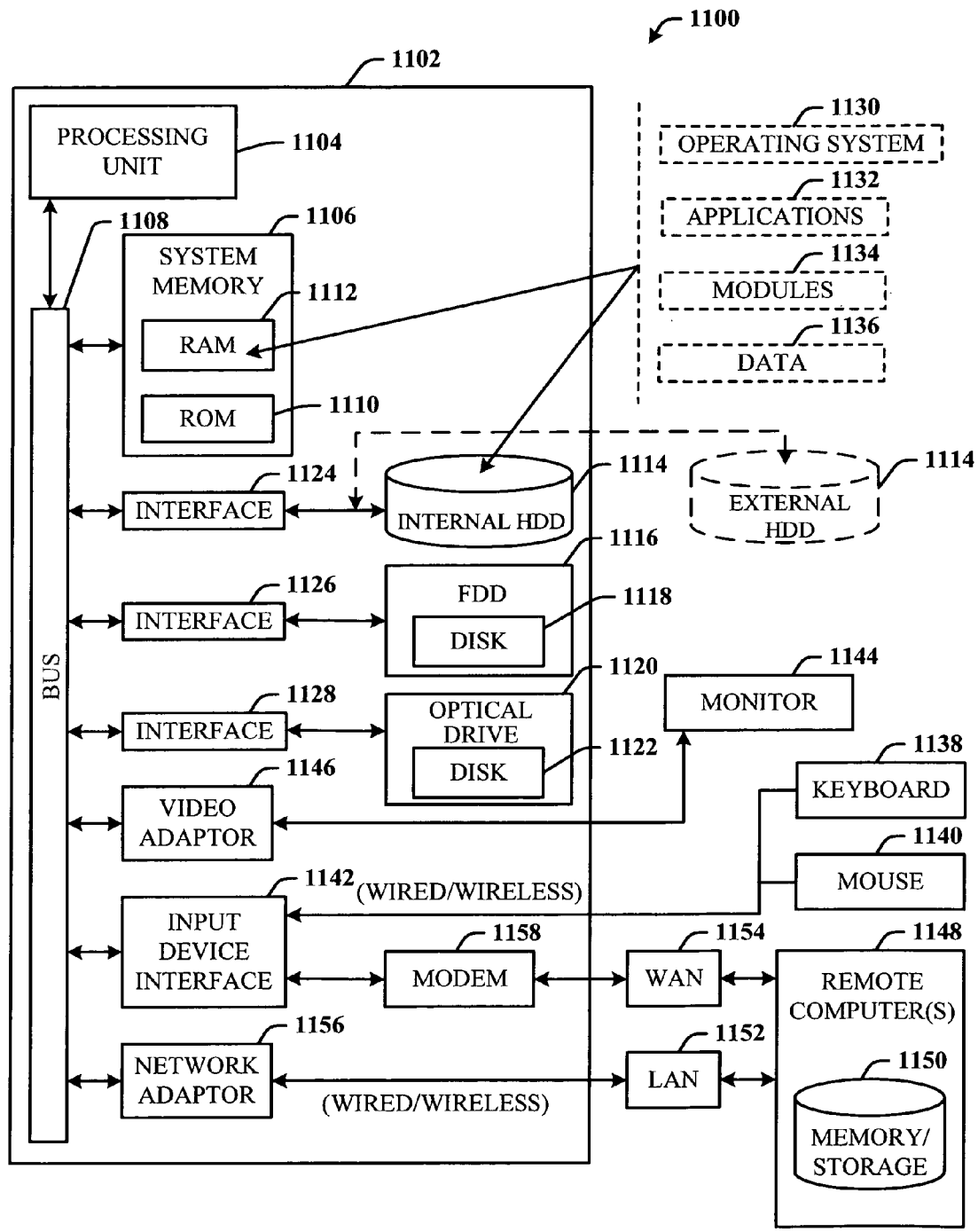
FIG. 11 illustrates a block diagram of a computer operable to execute the disclosed architecture.

Referring now to FIG. 11, there is illustrated a block diagram of a computer operable to process signal strength data and generate a field mapping in accordance with the subject invention. In order to provide additional context for various aspects of the subject invention, FIG. 11 and the following discussion are intended to provide a brief, general description of a suitable computing environment 1100 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, the exemplary environment 1100 for implementing various aspects of the invention includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116, and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject invention.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1112, including an operating system 1130, one or more application programs 1132, other program modules 1134, and program data 1136. All or portions of the operating system, applications, modules, and/or data can also be cached in the RAM 1112. It is appreciated that the invention can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device, or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adaptor 1156 may facilitate wired or wireless communication to the LAN 1152, which may also include a wireless access point disposed thereon for communicating with the wireless adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 12:
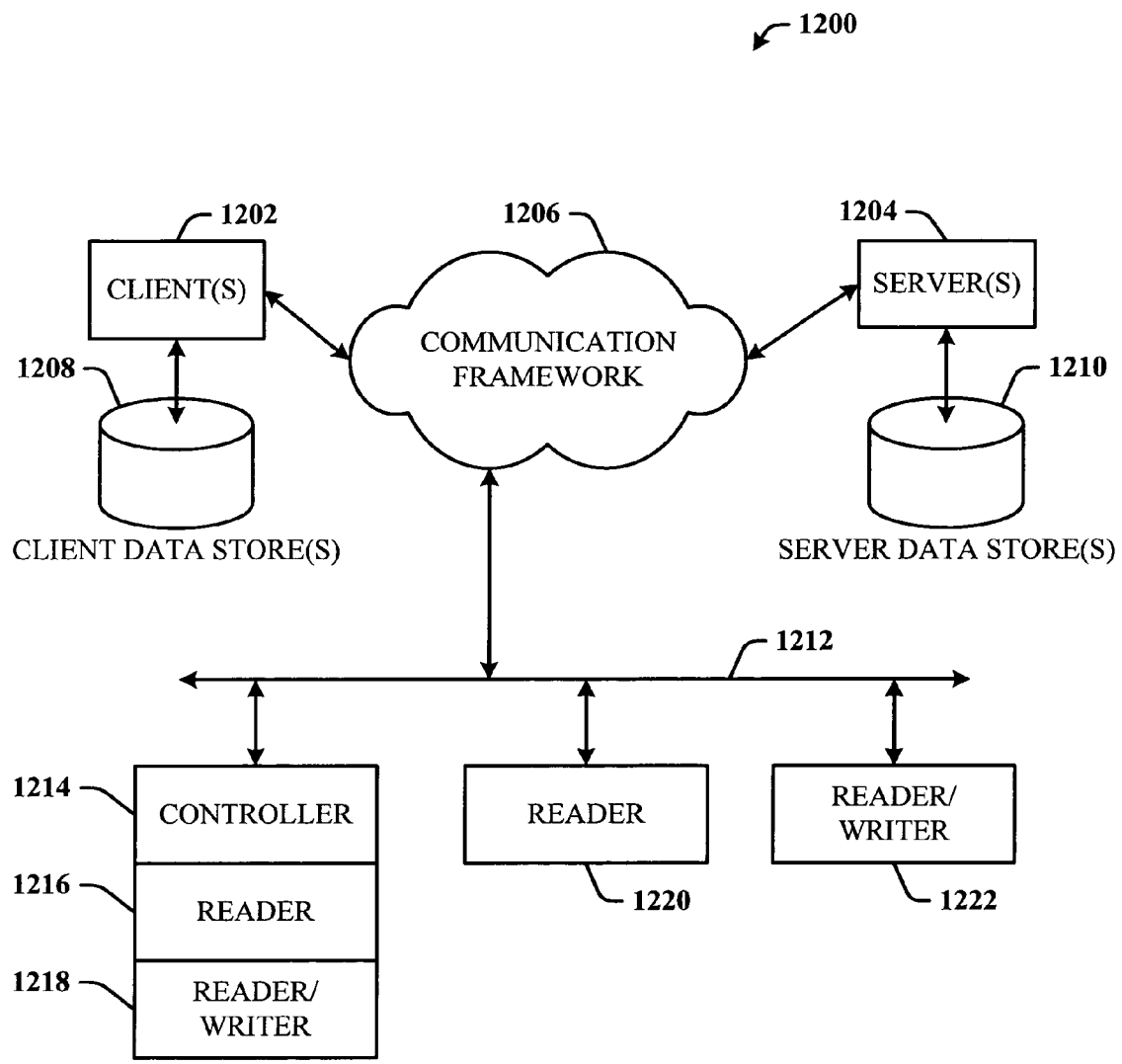
FIG. 12 illustrates a schematic block diagram of an exemplary computing environment in accordance with the subject invention.

Referring now to FIG. 12, there is illustrated a schematic block diagram of an exemplary computing environment 1200 that facilitates magnetic field mapping in accordance with the subject invention. The system 1200 includes one or more client(s) 1202. The client(s) 1202 can be hardware and/or software (e.g., threads, processes, computing devices). The client(s) 1202 can house cookie(s) and/or associated contextual information by employing the invention, for example.

The system 1200 also includes one or more server(s) 1204. The server(s) 1204 can also be hardware and/or software (e.g., threads, processes, computing devices). The servers 1204 can house threads to perform transformations by employing the invention, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

The framework 1206 can also include a subnetwork 1212, for example, that can be implemented as in an assembly line enviroment. The subnetwork 1212 can have disposed thereon as nodes, a controller 1214 (e.g., a PLC) that controls a reader module 1216 and a reader/writer module 1218 both of which can read RFID tags, and the latter of which can write data to the RFID tags. The controller 1214, reader module 1216 and reader/writer module 1218 can be provided in a rack configuration at selected locations. Alternatively or in combination therewith, the subnetwork 1212 can also include a second reader module 1220 as a wired or wireless node (or client) that is positioned (fixed or mobile) to read RFD tags, as needed. Similarly, the subnetwork 1212 can also support a reader/writer module 1222 as a wired and/or wireless client node for reading and writing data and signals to RFID tags that come within a coverage area.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A radio frequency identification (RFID) system, comprising:
    an RFID component that receives a signal from an RFID reader;
    an identifier component that interfaces to the RFID component and identifies a signal source of the signal;
    a signal strength component that interfaces to the identifier component and determines signal strength data of the signal; and
    a signal measurement component that interfaces to the RFID reader and determines a voltage level measurement of a signal received from the RFID component.

2. The system of claim 1, further comprising a mapping component that maps an electromagnetic field of the RFID reader based at least in part on the identified signal source.

3. The system of claim 2, wherein the mapping component maps the electromagnetic field based at least in part on the signal strength data and the voltage level measurement.

4. A radio frequency identification (RFID) system comprising:
    an RFID component that receives a signal from an RFID reader;
    an identifier component that interfaces to the RFID component and identifies a signal source of the signal;
    a signal strength component that interfaces to the identifier component and determines signal strength data of the signal; and
    an adjustment component that adjusts the signal strength data of the RFID reader based at least in part on one of the identified signal source and the signal strength data.

5. A radio frequency identification (RFID) system, comprising:
    an RFID component that receives a signal from an RFID reader;
    an identifier component that interfaces to the RFID component and identifies a signal source of the signal; and a signal strength component that interfaces to the identifier component and determines signal strength data of the signal, wherein the RFID reader is also a writer that writes data to the RFID component.

6. A radio frequency identification (RFID) system, comprising:

an RFID component that receives a signal from an RFID reader;

an identifier component that interfaces to the RFID component and identifies a signal source of the signal; and a signal strength component that interfaces to the identifier component and determines signal strength data of the signal, wherein the RFID component further comprises an environment component that analyzes environmental data associated with an operating environment.

7. The RFID system of claim 6, wherein the environment component comprises at least one of a temperature module, a humidity module, a shock module, and a vibration module.

8. A radio frequency identification (RFID) tag, comprising:

a transceiver component that receives a signal from an RFID reader; and a processing component that processes the signal to determine signal strength data, wherein the processing component processes a plurality of different frequencies each associated with a different frequency band.

9. The RFID tag of claim 8, wherein the signal strength data is transmitted via the transceiver component to a remote location.

10. The RFID tag of claim 8, wherein the signal includes a reader ID that uniquely identifies the reader.

11. The RFID tag of claim 10, wherein the transceiver component transmits both the signal strength data and the reader ID to a remote location.

12. The RFID tag of claim 8, wherein the signal strength data is calculated and transmitted in response to receiving the signal.

13. The RFID tag of claim 8, wherein the signal is associated with a band of frequencies.

14. The RFID tag of claim 13, wherein the band of frequencies includes 915 MHz.

15. A radio frequency identification (RFID) tag, comprising:

a transceiver component that receives a signal from an RFID reader; and a processing component that processes the signal to determine signal strength data, wherein the processing component receives environmental data associated with at least one of a temperature sensor, a humidity sensor, and a pressure sensor, and transmits the environmental data with the signal strength data.

16. A method of mapping an electromagnetic field of an RFID reader using a plurality of RFID tags, comprising:

transmitting a signal to the plurality of RFID tags from the RFID reader;

measuring at each tag a voltage associated with the signal;

adding the measured voltage to tag data transmitted to the RFID reader; and mapping the electromagnetic field based at least in part on the measured voltage at the plurality of RFID tags.

17. The method of claim 16, before mapping the electromagnetic field, performing acts of:

receiving the tag data and the measured voltage at the RFID reader; and measuring at the RFID reader a voltage associated with the tag data.

18. The method of claim 16, further comprising transmitting the measured voltage and a reader ID of the RFID reader to a remote location to determine the mapping.

19. The method of claim 16, wherein the field is associated with an area of coverage of the RFID reader.

20. The method of claim 16, further comprising adjusting a signal strength based upon the mapping.

21. The method of claim 16, further comprising adjusting a signal range based upon the mapping.

22. The method of claim 16, further comprising obtaining an operating data parameter.

23. The method of claim 22, wherein the parameter is one of signal strength data and signal origin data.

24. A system that facilitates an RFID data read operation, comprising:

means for receiving a read signal;

means for analyzing the read signal;

means for collecting signal strength data of the read signal; and means for mapping an electromagnetic field of an RFID reader based in part on the signal strength data.

* * * * *